United States Patent [19]

Yamaguchi et al.

[11] Patent Number: 5,574,555

[45] Date of Patent: Nov. 12, 1996

[54] LENS INSPECTION METHOD AND APPARATUS

[75] Inventors: Yukihiko Yamaguchi; Masahiro Tagi, both of Kanagawa, Japan

[73] Assignee: Fuji Photo Film Co., Ltd., Kanagawa, Japan

[21] Appl. No.: 243,136

[22] Filed: May 16, 1994

[30] Foreign Application Priority Data

May 14, 1993 [JP] Japan .................................. 5-113456

[51] Int. Cl.⁶ ..................................................... G01B 9/00
[52] U.S. Cl. ........................... 356/125; 250/201.2; 396/89
[58] Field of Search ..................................... 356/124–127; 250/201.2, 204; 348/187, 345; 354/402, 406, 407, 408

[56] References Cited

U.S. PATENT DOCUMENTS

| | | | |
|---|---|---|---|
| 3,493,764 | 2/1970 | Craig | 356/125 |
| 3,782,829 | 1/1974 | Herriott | 356/127 |
| 4,282,548 | 8/1981 | Plummer | 356/125 |
| 4,435,079 | 3/1984 | Hennick | 356/125 |
| 5,003,165 | 3/1991 | Sarfati et al. | 250/201.2 |
| 5,017,005 | 5/1991 | Shindo | 356/125 |

FOREIGN PATENT DOCUMENTS

| | | |
|---|---|---|
| 55-20420 | 2/1980 | Japan . |
| 56-123505 | 9/1981 | Japan . |
| 58-118943 | 7/1983 | Japan . |
| 59-216032 | 12/1984 | Japan . |
| 1107127 | 4/1989 | Japan . |

Primary Examiner—Hoa Q. Pham
Attorney, Agent, or Firm—Young & Thompson

[57] ABSTRACT

A lens inspection device has an objective lens composed by front and rear lenses, a two-dimensional image sensor and an image forming lens for forming a point image of light passing through the objective lens. A lens to be inspected is disposed between a light source and an object focal point of the objective lens. The light source projects a light beam through the lens to be inspected parallel to the optical axis of the objective lens, and the front lens of the objective lens is moved along the optical axis so as to shift the object focal point of the objective lens stepwise into a plurality of positions within a predetermined range including a normal focal point of the lens to be inspected. Brightness data of a point image formed on the two-dimensional image sensor is detected for each shifted position of the objective lens, and is used for judgment as to whether an actual focal point of the lens to be inspected is within a proper range. The location of the point of maximum brightness is also detected, so as to determine whether the inspected lens is misaligned as mounted in a camera or in a lens-fitted photographic film unit.

21 Claims, 9 Drawing Sheets

LENS INSPECTION METHOD AND APPARATUS

BACKGROUND OF THE INVENTION

1. Field of the Invention

The present invention relates to a lens inspection method and apparatus for judging whether the focal point of a lens is in a proper range, and more particularly to a lens inspection method and apparatus which is suitable for inspecting taking lenses of lens-fitted photographic film units during the manufacture of the film units.

2. Related Art

The focal length and the alignment of the optical axis may be considered the most fundamental factors which affect the performance of the taking lens of a camera. In compact cameras and lens-fitted photographic film units, the taking lenses are mounted in main housings. Therefore, if the taking lens is mounted off-center, or if the spacing between lens elements of the taking lens is incorrect, the optical axis or the focal point will deviate from normal positions, which degrades the optical properties of the taking lens. Other lenses, such as interchangeable lenses for single-reflex cameras, may also suffer the same trouble as above when mounted in lens barrels.

For this reason, these properties of lenses are inspected during or after the manufacture of the camera. In conventional lens inspections, for example, modulation transfer function (MTF) is measured, as is disclosed in JPA 55-20420 and JPA 58-118943, or an aerial image of a test chart is observed through a microscope. Alternatively, the image of a test chart is picked up as an image signal, and the image signal is analyzed.

However, because a large scale apparatus and a long time are necessary for MTF measurement, the lens inspection based on the MTF is unsuitable for mass-produced lenses.

Microscopic observation of the test chart image is basically a visual inspection, and so the result of this inspection tends to have variations in accuracy; the inspection is quite time-consuming.

Picking up the test chart image by a CCD camera and analyzing the image signal in a computer also requires a long time. Therefore, the third method is also impractical for inspecting mass-produced lenses efficiently.

OBJECT OF THE INVENTION

In view of the foregoing, a primary object of the present invention is to provide a lens inspection method and apparatus, which make it possible to automatically and quickly judge as to whether the focal point of a lens, which is one of fundamental properties of the lens, is placed in a proper range, without the need for visual inspection.

SUMMARY OF THE INVENTION

To achieve the above and other objects, the present invention positions a lens to be inspected between a light source and an object focal point of an objective lens of an inspection device, and projects a light bundle from the light source onto the lens to be inspected parallel to the optical axis of the objective lens. The objective lens is shifted stepwise along its optical axis so as to shift the object focal point of the objective lens into a plurality of positions over a range on opposite sides of a normal focal point of the lens to be inspected. A light spot image or point image is formed on a two-dimensional image sensor through an image forming lens disposed coaxially behind the objective lens. Brightness data of the point image are detected for each shifted position of the objective lens, and are used for making a judgment as to whether an actual focal point of the lens to be inspected is within a proper range in a direction parallel to the optical axis.

The actual focal point can be determined based on the brightness of the point image, because when the object focal point of the objective lens coincides with the actual focal point of the lens to be inspected the point image is in the sharpest or focused condition and has a minimum spot size and a maximum brightness level.

The actual focal point may be different from lens to lens that is inspected, even of the same design. However, because the object focal point of the objective lens is shifted stepwise in the vicinity of the normal focal point of the lens to be inspected, and the data about the point image which changes with the movement of the objective lens, is detected for each shifted position, it is not always necessary for determining an actual focal point to bring the object focal point of the objective lens into coincidence with the actual focal point.

According to a preferred embodiment, brightness peak values of the point image are detected in the respective shifted positions of the objective lens, and the actual focal point of the lens inspected is determined based on the correlation between the peak values and the shift positions.

According to another preferred embodiment, the number of pixels included in an area of the point image wherein brightness is above a predetermined level, is detected as the brightness data for each shifted position of the objective lens, and the actual focal point of the lens to be inspected in the axial direction is determined based on the correlation between the pixel number and the shifted positions.

By forming a point image on a two-dimensional image sensor, it is also possible to determine the position of the point image on the image sensor and to check whether the lens that is inspected is centered based on the two-dimensional position of the image.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

The embodiment described below relates to the inspection of taking lenses of lens-fitted photographic film units during manufacture of the units. Such a lens-fitted photographic film unit, hereinafter referred to simply as a film unit, is an article whose unit housing has a simple exposure mechanism incorporated therein and is loaded with a photographic film cassette when purchased. The unit housing is mainly formed from resin materials, and is covered with an outer cardboard casing having cut-outs necessary for operating the film unit.

Figure 1:
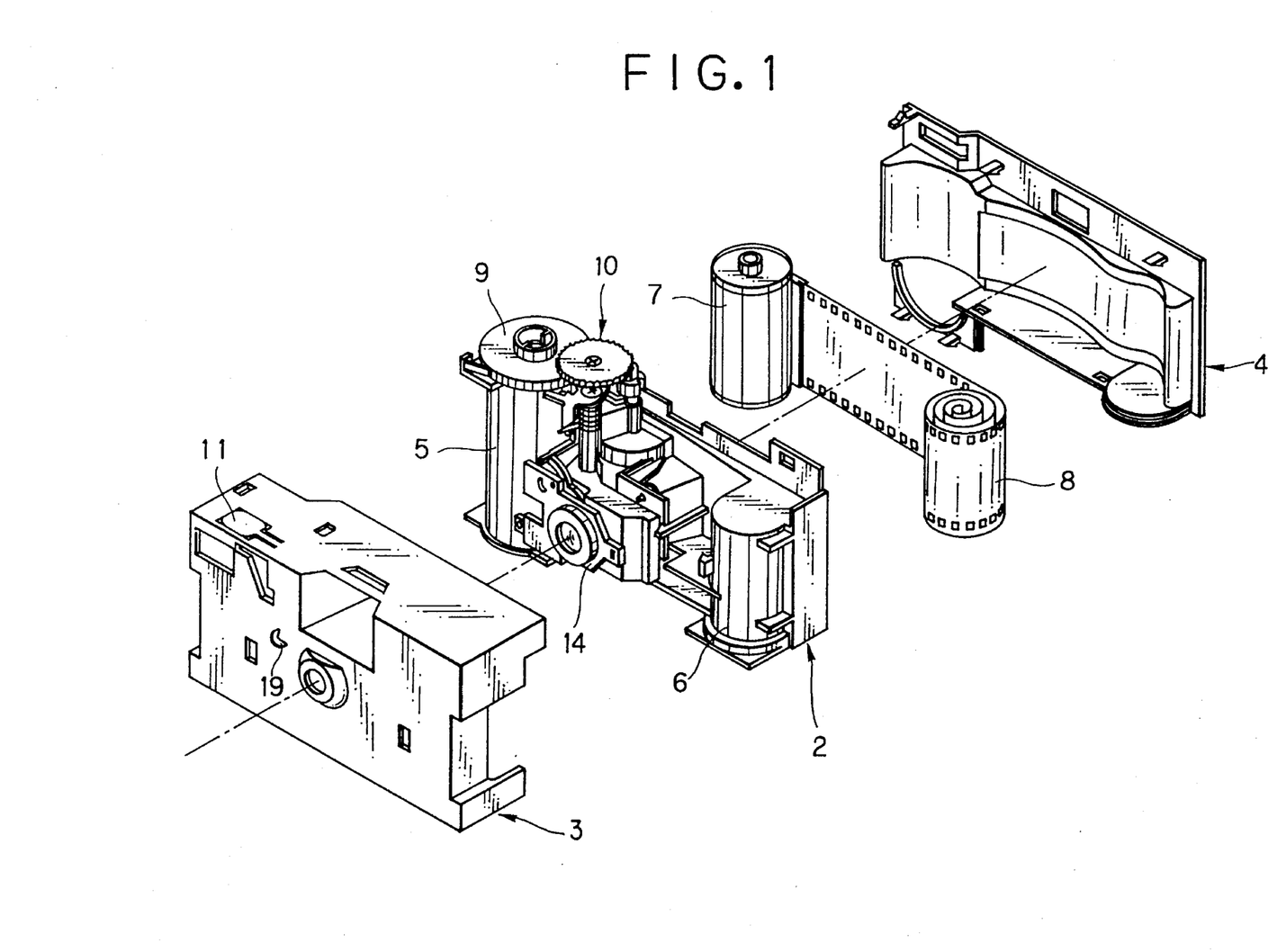
FIG. 1 is an exploded perspective view of a lens-fitted photographic film unit that is adapted to be inspected by the method and apparatus of the present invention.

FIG. 1 shows an example of such a lens-fitted photographic film unit in an exploded view, with its outer cardboard casing omitted. The unit housing is constituted of a main body 2, a front cover 3 and a rear cover 4. A cassette chamber 5 and a film roll chamber 6 are integrally formed with the main body 2 so as to contain a film cassette 7 and a roll of photographic film 8 respectively therein. The film cassette 7 and the photographic film 8 are protected from ambient light When the rear cover 4 is attached to the main body 2 by snap-in engagement.

A film advancing wheel 9 is mounted on the main body 2 to engage at its forked lower portion with a spool of the film cassette 7, so that an exposed portion of the photographic film 8 can be rewound into the film cassette 7 by rotating the film advancing wheel 9 after each exposure.

An exposure unit 10 is attached to the main body 2 through a snap-in engagement. The exposure unit 10 has a sprocket wheel engaging with perforations of the photographic film 8, a shutter mechanism, a film frame counter mechanism, and a film advance stop mechanism, which operate such that each time the photographic film 8 has been advanced one frame by rotating the film advancing wheel 9, the shutter mechanism is cocked, and the film advancing wheel 9 is prevented from rotating.

The front cover 3 covers the front of the main body 2, and has a shutter button 11 formed integrally therewith. Upon depression of the shutter button 11, the exposure unit 10 is actuated to release the shutter mechanism.

Figure 2:
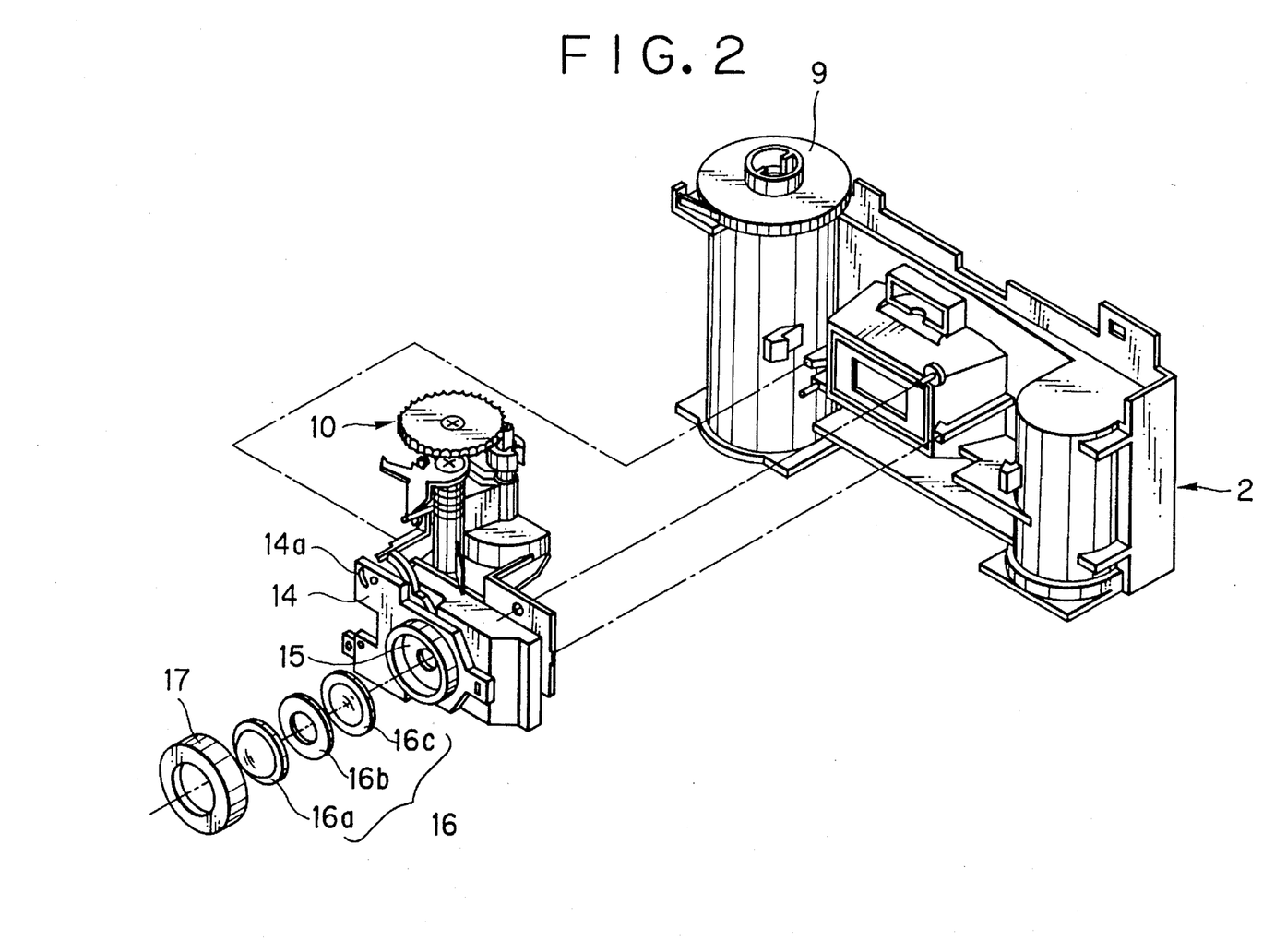
FIG. 2 is an exploded perspective view of the taking lens of the film unit of FIG. 1.

A shutter cover 14 is mounted in front of the exposure unit 10. As shown in detail in FIG. 2, the shutter cover 14 has a lens mounting portion 15. A front lens element 16a, a spacer 16b and a rear lens element 16c, which together constitute a taking lens 16, are mounted in the lens mounting portion 15 and are fixed by a holding ring 17.

Figure 3:
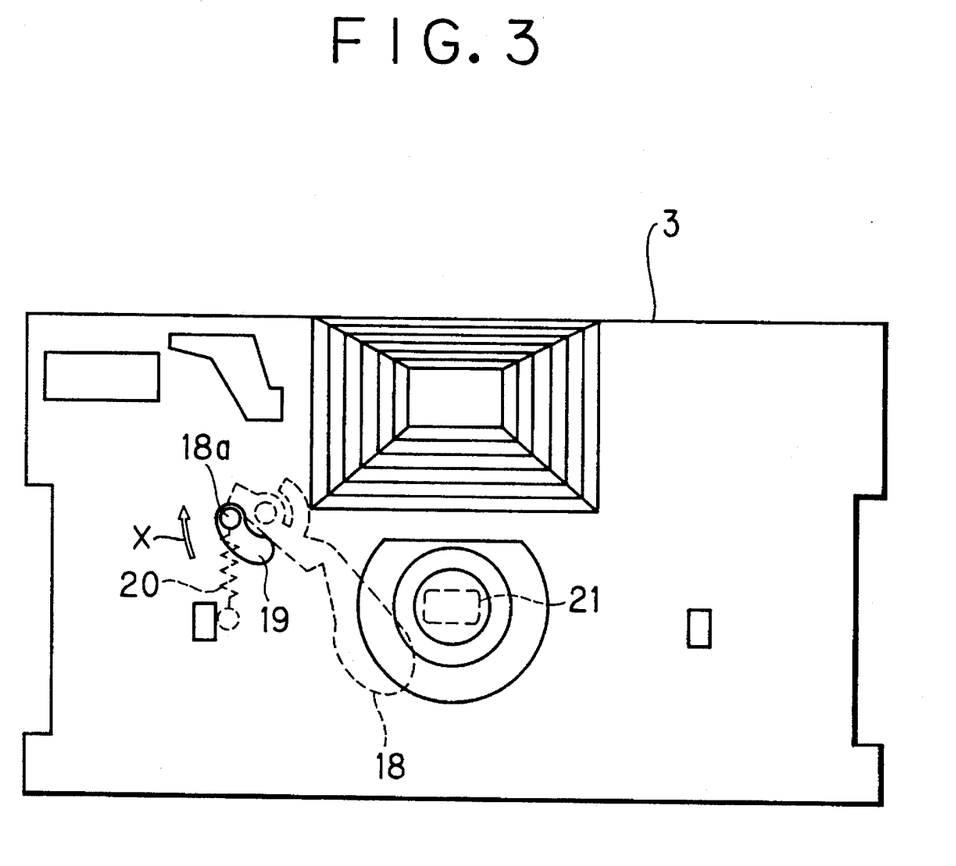
FIG. 3 is a schematic front view of the film unit of FIG. 1.

Behind the shutter cover 14, there are mounted a shutter blade 18 movable to open an exposure opening 21 when struck by a lever of the shutter mechanism, and a spring 20 for urging the shutter blade 18 to a closed position for closing the exposure opening 21, as is shown in FIG. 3. The shutter blade 18 has a pin 18a protruding to the outside of the film unit through a slot 14a in the shutter cover 14 and a slot 19 in the front cover 3. By moving the pin 18a in a direction shown by an arrow X, the shutter blade 18 may be moved to the open position against the force of the spring 20 and may be held in that open position for lens inspection purposes.

Figure 4:
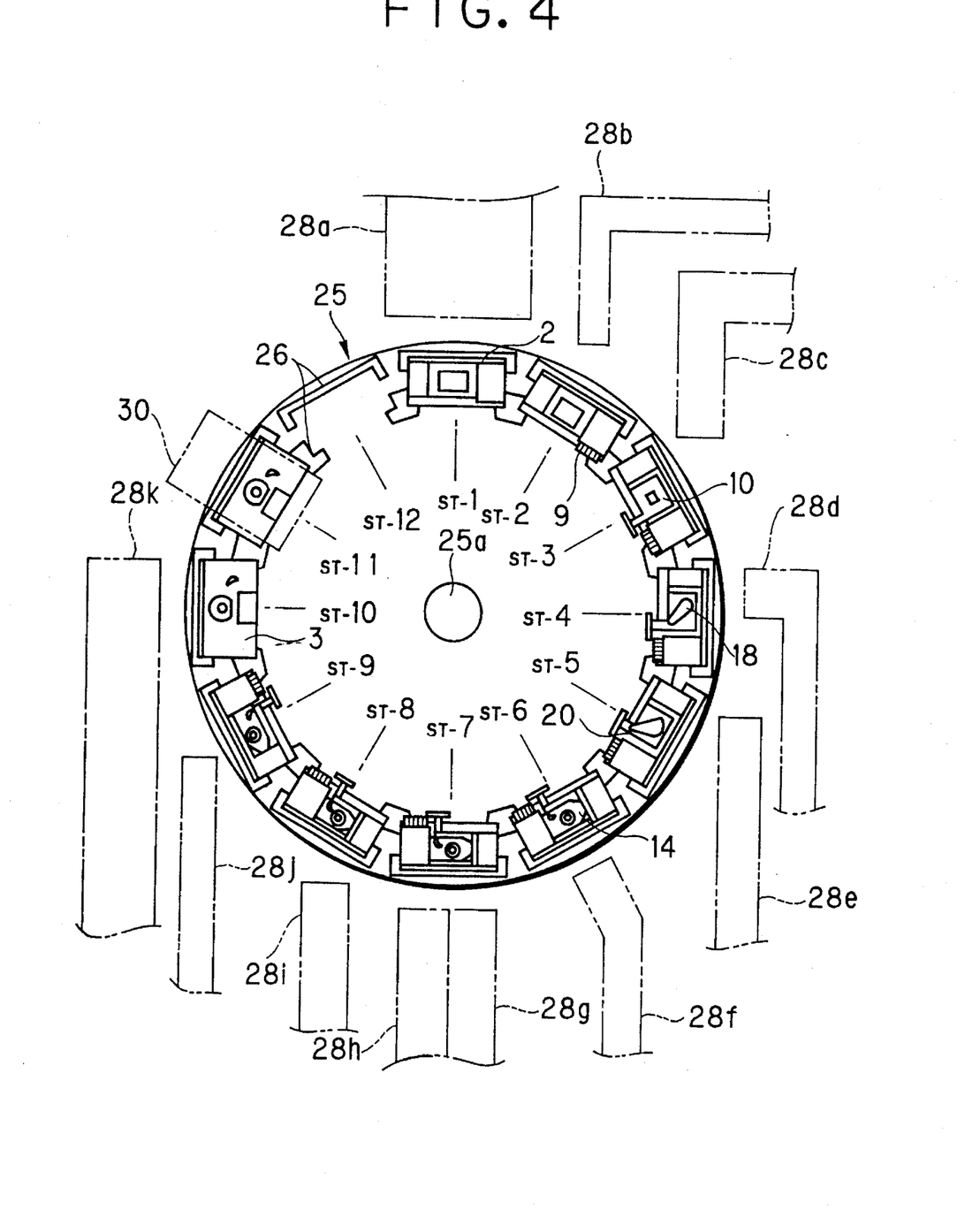
FIG. 4 is a diagrammatic plan view of a film unit assembly line.

In a schematically illustrated film unit assembly line shown in FIG. 4, an indexing table 25 is rotated stepwise about a rotary shaft 25a to stop units undergoing manufacture so that they will be temporarily and successively positioned in respective, e.g. twelve positioning frames 26 of the table 25 seriatim at twelve stations ST-1 to ST-12 at short intervals of 2.5 seconds or so. As indicated by phantom lines in FIG. 11, parts feeding and assembling sections 28a to 28k are disposed around the indexing table 25 for feeding designated parts to the stations ST-1 to ST-10, wherein robots assembly the respective parts.

In the first station ST-1, the main body 2 is placed in the positioning frame 26. In the second station ST-2, the film advancing wheel 9 is mounted on the main body 2. In the third station ST-3, the exposure unit 10 is mounted on the main body 2. In the fourth, fifth and sixth stations, the shutter blade 18, the spring 20 and the shutter cover 14 are assembled, respectively. In the seventh station, the rear lens element 16c and the spacer 16c are mounted, and in the eighth station, the front lens element 16a is mounted. In the ninth station, the holding ring 17 is mounted to complete the assembly of the main body 2. In the tenth station, the front cover 3 is mounted in a position to cover the front of the main body 2.

In the eleventh station ST-11, a lens inspection device 30 of the invention is so disposed as to inspect the taking lens 16 in its assembled position. The twelfth position is a discharge station for discharging the assembled units from the assembly line while separating defective ones from non-defective ones depending on the results of the inspection in the eleventh station. The non-defective units are transferred to another manufacturing line where the photographic film cassette is loaded and the rear cover 4 is attached.

Figure 5:
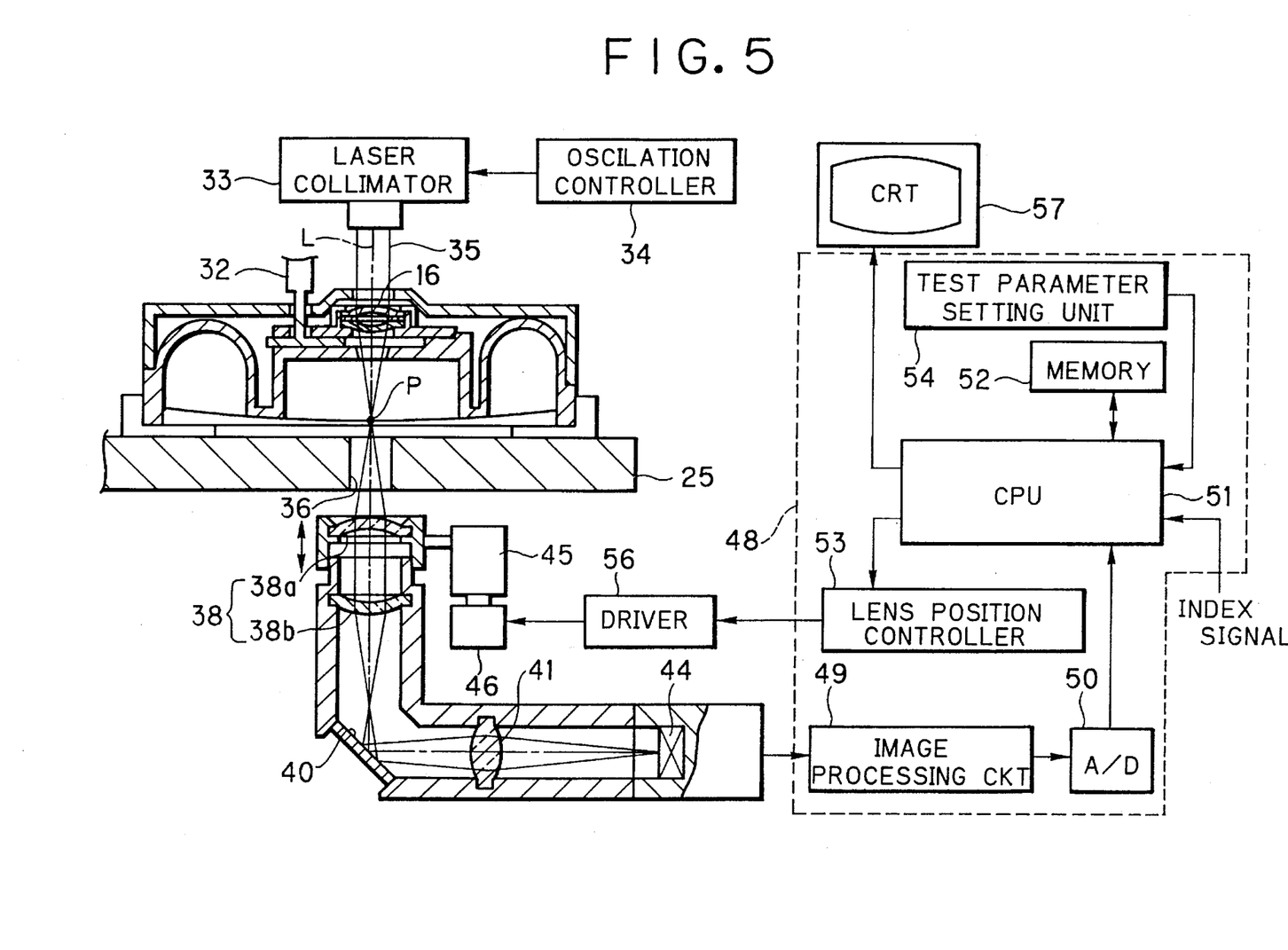
FIG. 5 is a diagram illustrating the overall construction of a lens inspection device according to a preferred embodiment of the invention.

FIG. 5 schematically shows an embodiment of the lens inspection device 30. The lens inspection device 30 is provided with a shutter opening implement 32 and a laser collimator 33. The shutter opening implement 32 actuates the pin 18a to maintain the shutter blade 18 in the open position when the main body 2 is positioned in the eleventh station ST-11. In this state, the laser collimator 33 projects a laser beam 35 in the form of a parallel bundle having, for example, a wavelength of 670 nm and a beam diameter of 2 mm, along a normal optical axis L of the taking lens 16. As oscillation controller 34 controls a laser oscillator of the laser collimator 33 so that the laser beam 35 is always projected at a constant intensity.

The indexing table 25 has openings 36 formed therethrough to be coaxial with the optical axis L of the taking lens 16 when the main body 2 is positioned in positioning frame 26. When the indexing table 25 stops properly, the opening 36 is disposed coaxially above an objective lens 38 of the lens inspection device 30 in the eleventh station ST-11. The objective lens 38 is constituted of front and rear lenses 38a and 38b. The laser beam 35, after passing through the taking lens 16, converges at a focal point P in the image plane of the taking lens 16, and thereafter enters the front lens 38a through the opening 36. If an object focal point Q of the front lens 38a coincides with the image focal point P of the taking lens 16, the laser beam 35 is again converted into a parallel bundle through the front lens 38a before falling on the rear lens 38b of the objective lens 38. A mirror 40 and an image-forming lens 41 are disposed behind the rear lens 38b, and a two-dimensional image sensor, such as a CCD image sensor 44, is disposed in the image plane of the image forming lens 41.

The front lens 38a may be moved stepwise to any of a plurality of predetermined positions, e.g., ten positions, along the optical axis L by means of a lens shifting mechanism 45 and a stepping motor 46. Thereby, the object focal point Q of the front lens 38a may be shifted within a predetermined range to the front and rear of a normal position of the focal point P of the taking lens 16 along the optical axis L, as is diagrammatically shown for instance in FIGS. 6A, 6B and 6C. Since a point image formed on the image sensor 44 is based on the parallel light bundle projected from the front lens 38a, the magnification of the image on the image sensor 44 is maintained constant even while the front lens 38a is moved in the axial direction.

Figure 6A:
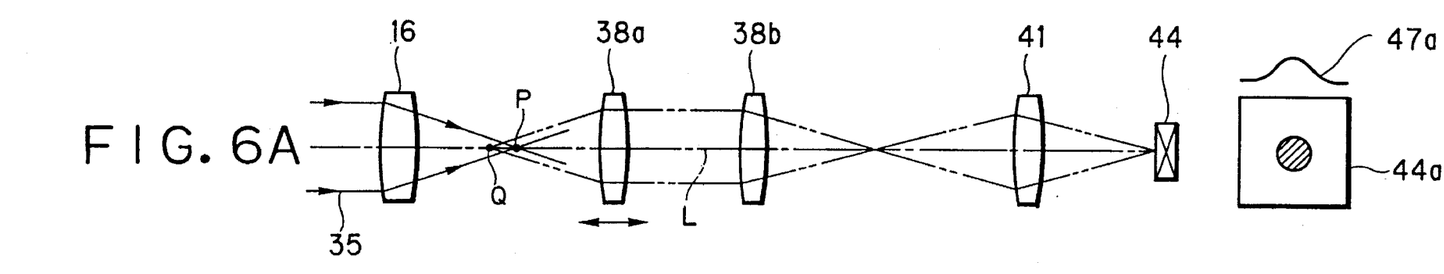
FIGS. 6A, 6B and 6C are diagrams illustrating three different focusing situations of an objective lens of the lens inspection device shown in FIG. 5, whose object focal point is shifted stepwise along the optical axis relative to a focal point of a lens to be inspected.
Figure 6B:
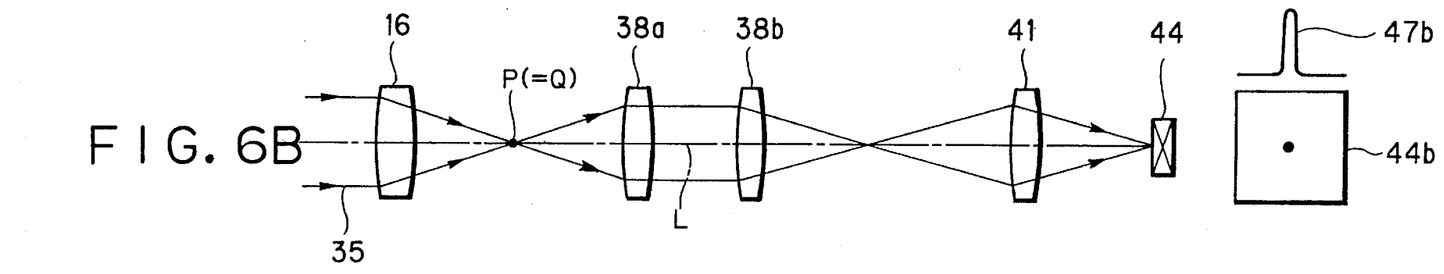

FIG. 6B shows a situation in which the object focal point Q of the front lens 38a coincides with the focal point P of the taking lens 16, wherein the point image formed on the image sensor 44 is in focus and so has a minimum diameter of spot and a maximum brightness, as is indicated by a pattern 44b and a curve 47b of brightness of the image.

Figure 6C:
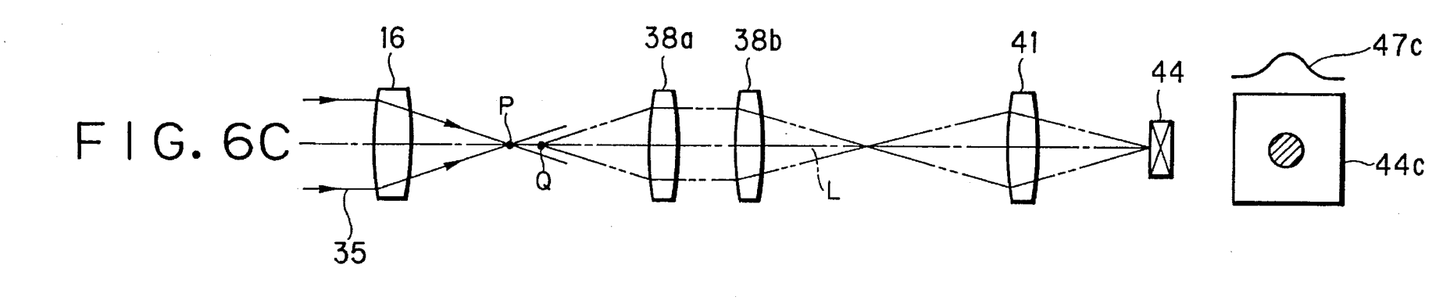

FIG. 6A and 6C show rear and front focus situations, respectively, where the object focal point Q does not coincide with the focal point P of the taking lens 16, wherein the point image formed on the image sensor 44 is blurred and has a larger diameter of spot and a less brightness, as is indicated by patterns 44a and 44c and curves 47a and 47c of the brightness. As shown by the curves 47a to 47c, the brightness level is maximum in the center of the point image and decreases in outward radial directions.

A signal output from the image sensor 44 is sent to a system controller 48. The system controller 48 is constituted of an image processing circuit 49, an A/D converter 50, a CPU 51, a memory 52, a lens position controller 53 and a test parameter setting unit 54. The image processing circuit 49 converts the signal from the image sensor 44 into an image signal. The A/D converter 50 converts the image signal into a digital signal by quantifying the brightness level of each pixel of the image sensor 44. The digital signal is input into the CPU 51.

The CPU 51 also receives an index signal each time the indexing table 25 is positioned after having been moved by one step of constant pitch. In response to the index signal, the CPU 51 executes an inspection program which is stored in ROM locations of the memory 52, and writes various data in RAM locations of the memory 52. The data is obtained during the execution of the inspection program. The lens position controller 53 drives the stepping motor 46 through a driver 56 under the control of the CPU 51. Thereby, the front lens 38a and thus the object focal point Q thereof are shifted by a constant pitch, e.g., 80 μm in each step along the optical axis L. The CPU 51 accepts the image signal for each shift position of the front lens 38a. Therefore, the shift positions may be referred to as measurement positions. A CRT monitor 57 displays the pattern of the point image formed on the image sensor 44 and/or results of inspections.

The test parameter setting unit 54 is operated to set or enter parameters, such as a predetermined normal focal length of the taking lens 16 to be inspected, the shift range of the front lens 38a, the pitch of shifting of the front lens 38a in the shift range, and other data. The lens position controller 53 operates in accordance with these parameters to shift the front lens 38a seriatim into the predetermined measurement positions during the inspection.

Figure 7:
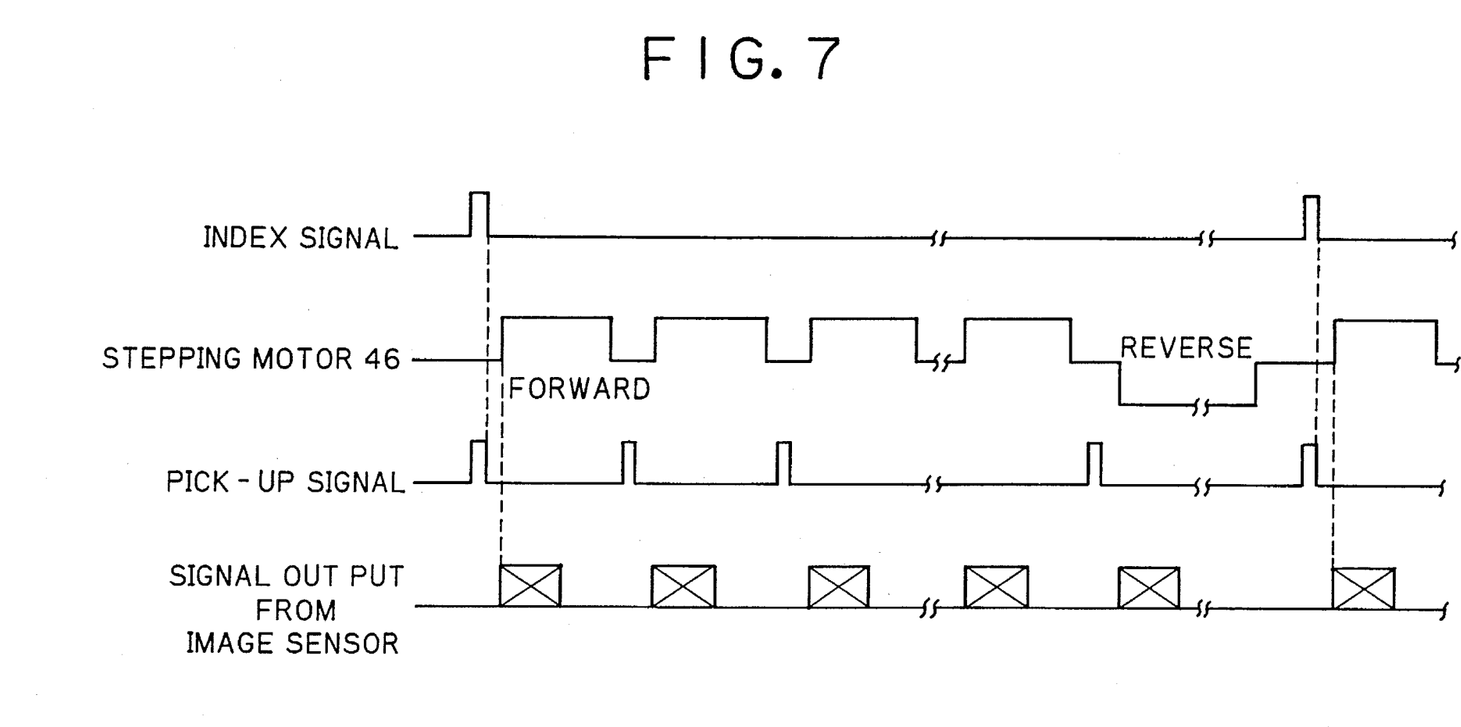
FIG. 7 is a timing chart illustrating the operation sequence of the lens inspection device shown in FIG. 5.

The operation of the lens inspection device as set forth above will next be described with reference to FIG. 7. When the indexing table 25 has been rotated to position a unit or main body 2 in the eleventh station ST-11, an index signal is input to the CPU 51. The laser collimator 33 projects a parallel bundle as a laser beam 35, which is controlled to have a constant intensity, toward the taking lens 16. At the beginning of the inspection, the front lens 38a is placed in an initial position S1 which is determined according to the parameters set in the inspection parameter setting unit 54, such that the front lens 38a in the initial position S1 is in a rear focus situation relative to a normal position of the focal point P of the taking lens 16, as is shown in FIG. 6A, assuming all the lens elements 16a and 16c and the spacer 16b of the taking lens 16 are properly formed and are correctly assembled.

Figure 8:
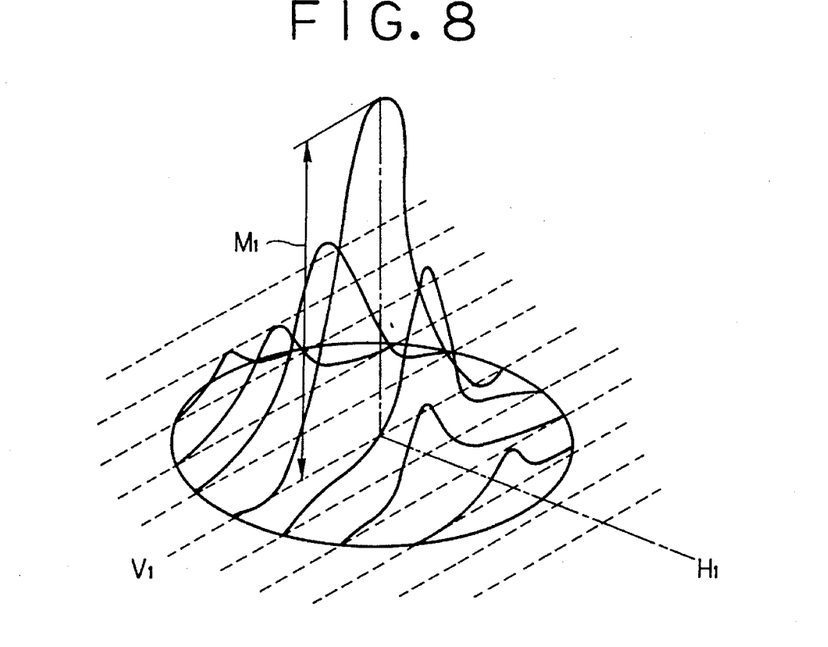
FIG. 8 is a diagram illustrating an example of image brightness distribution on an image sensor of the lens inspection device, three-dimensionally along respective scanning lines of the image sensor.

In this rear focus situation of the front lens 38a, the point image formed on the image sensor 44 is blurred as illustrated by the pattern 44a. In response to a pick-up signal from the CPU 51, the image sensor 44 picks up the image at an electronic shutter speed of, for example, 1/2000 sec., to output an electric signal. The electric signal is converted into an image signal line by line through the image processing circuit 49. In the rear focus situation of the front lens 38a relative to the focal point P, the brightness level of the image signal detected along each scanning line of the image sensor 44 changes along the scanning line as well as between the scanning lines, as is shown in FIG. 8.

The image signal is quantified by the A/D converter 50, and the CPU 51 determines a peak brightness value M1 of the point image formed when the front lens 38a is in the initial position S1, and determines a vertical location V1 and a horizontal location H1 of the brightness peak on the basis of a scanning line position and a horizontal scanning signal corresponding to the image signal having the peak value M1. While the image signal is collected from the image sensor 44 through the image processing circuit 49, the CPU 51 controls the lens position controller 53 to drive the driver 56 to move the stepping motor 46 by one step, thereby to shift the front lens 38a along the optical axis L into the second measurement position S2, 80 μm forward from the initial position S1.

Figure 9:
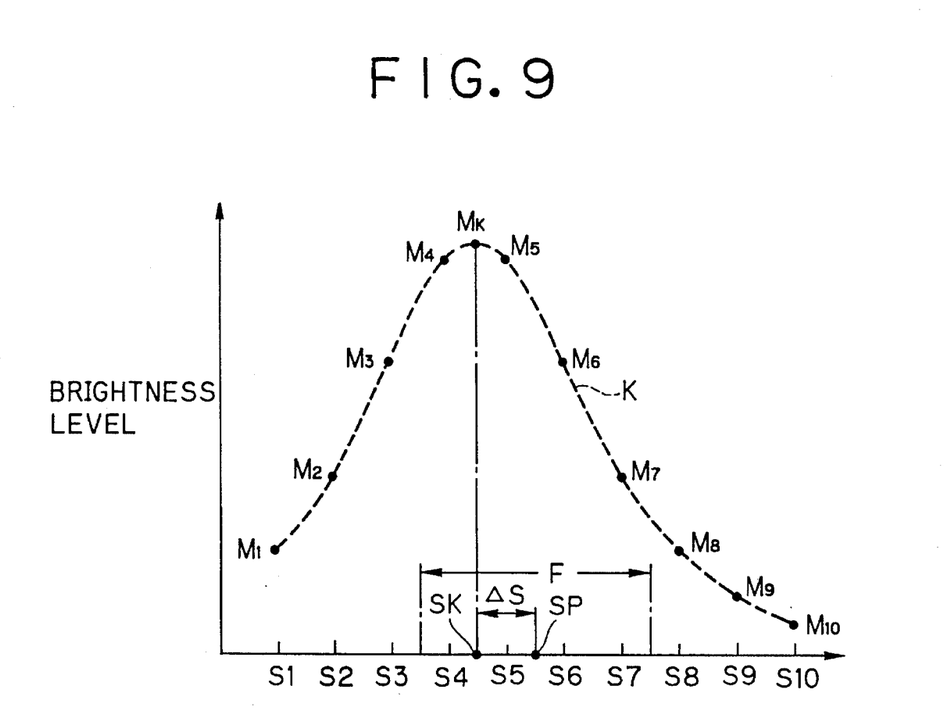
FIG. 9 is a graph illustrating the relationship between the measurement positions of the objective lens and the peak brightness levels on the image sensor.

After the front lens 38a is shifted into the second measurement position S2, a second pick up signal is output to the image sensor 44, so that an image signal is picked up in the same way as above. In this way, the front lens 38a is seriatim shifted from the initial position S1 to the tenth measurement position S10 wherein the front lens 38a is in a front focus situation relative to the normal position of the focal point P of the taking lens, as is shown in FIG. 6C. A peak brightness value and a corresponding location of the brightness peak are detected for each measurement position. FIG. 9 shows the ten brightness peak values M1 to M10 plotted against the ten measurement positions S1 to S10. It is to be noted that the time necessary for each measurement is about 50 msec., so that the time necessary for judging whether the taking lens 16 is defective is at most 1.5 sec. or so, including the time required for data processing. The data processing for judgment will be described below.

On the basis of these ten peak values M1 to M10, the CPU 51 calculates a quadratic curve K as shown by dashed lines in FIG. 9 according to a quadratic curve approximation method. Using this curve K, it is possible to calculate a brightness peak Mk and a position Sk of the front lens 38a at which the brightness peak Mk is obtained.

It is assumed in the embodiment shown in FIG. 9 that, so long as the taking lens 16 is properly assembled and hence the focal point P of the taking lens 16 is exactly in the normal position corresponding to the predetermined normal focal length, the object focal point Q of the front lens 38a will coincide with the focal point P of the taking lens 16 when the front lens 38a is in a predetermined position SP. If the focal point P of the taking lens 16 deviates a distance ΔS from the normal position, the position Sk of the front lens 38a, at which the brightness peak Mk is obtained, also deviates the same distance Δ from the predetermined position SP. Therefore, it is possible to judge whether the focal point P of the taking lens 16 is proper or not, depending on whether the position Pk is included in a predetermined range as indicated, for instance, by F in FIG. 9. If any of the lens elements 16a and 16c is stained, or the aperture diameter of the spacer 16b is outside an acceptable range, the peak value Mk of the approximate quadratic curve K would be changed. Therefore, it is possible to check the brightness of the taking lens 16 depending on whether the peak value Mk is in an acceptable range.

Figure 10:
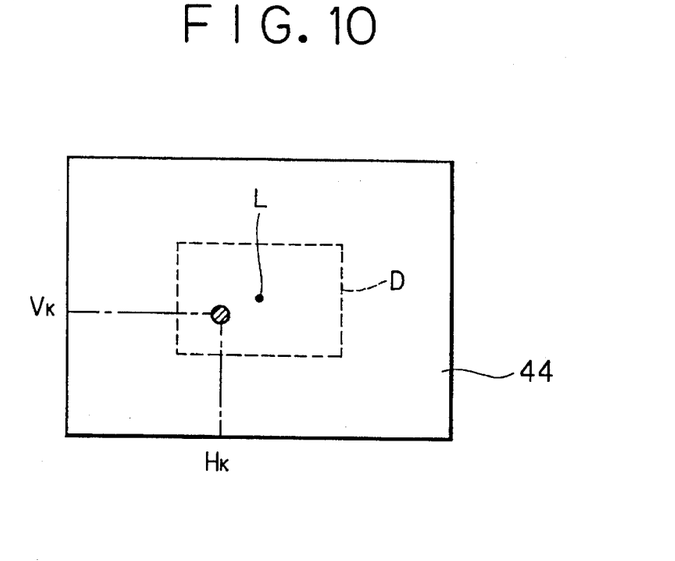
FIG. 10 is an explanatory view illustrating a center position of an image formed on the image sensor.

Because a vertical location Vn and a horizontal location Hn of a peak value Mn (n=1, 2, 3 . . . ) are detected as data while the image signal is derived from the electric signal from the image signal 44, as is described with reference to FIG. 8, it is possible to calculate the location of the center of the point image on the basis of these locations Vn and Hn. The locations Vn and Hn are generally unchanged during the ten times of measurements for one taking lens 16, but it may be possible to calculate an average of the vertical locations V1 to V10 and that of the horizontal locations H1 to H10 to obtain the coordinates (Vk, Hk) of the point image, so as to determine whether the location of the point image represented by the coordinates (Vk, Hk) is included in a predetermined peripheral range D around the optical axis L on the image sensor 44. Thereby, it is possible to judge whether the misalignment of the taking lens 16 is acceptable.

After the completion of the tenth measurement in the measurement position S10 of the front lens 38a, the CPU 51 causes the stepping motor 46 to rotate in a reverse direction through the lens position controller 53 and the driver 56, until the front lens 38a is returned to the initial position S1. Thereafter, when the indexing table 25 is rotated by one step of constant pitch to position the next unit or main body 2 in the eleventh station ST-11, an index signal is inputted to the CPU 51. Then, the lens inspection device 30 starts the inspection of the taking lens 16 mounted in the main body 2 positioned in the eleventh station ST-11.

According to the above-described inspection, deviation of focal point or optical axis of the taking lens 16 may be automatically and quickly detected. Such deviation may be caused when any of the elements 16a, 16b and 16c of the taking lens is not assembled or improperly assembled, or the precision of these elements is insufficient. Because the objective lens 38 of the lens inspection device 30 is constituted by the front and rear lenses 38a and 38b which are afocal to each other, the magnification of the point image on the focal plane is maintained constant even while the front lens 38a is shifted. Thereafter, any measurement error which would be caused by an image magnification change is avoided, and the results of measurement are stable even if an optical system for enlarging the point image is disposed behind the objective lens.

When it is required to inspect a lens having a different focal length, and thus the normal focal point of the lens changes correspondingly, appropriate parameters will be set in the test parameter setting unit 54. Also, the number of measurement positions of the front lens 38a, as well as the shift amount of the lens 38a between the measurement positions may be appropriately selectable.

Although the above-described focal point determination method utilizes brightness peak values of the point image which change with the focusing situation of the objective lens 38 relative to the focal point P of the taking lens 16, it is instead possible to utilize for lens inspection the fact that the farther the focal point Q of the front lens 38a deviates from the focal point P of the taking lens 16, the worse the image formed on the image sensor 44 is out of focus, and that the farther the point image is out of focus, the larger the diameter of the spot, and the lower the brightness level of the image.

Figure 11:
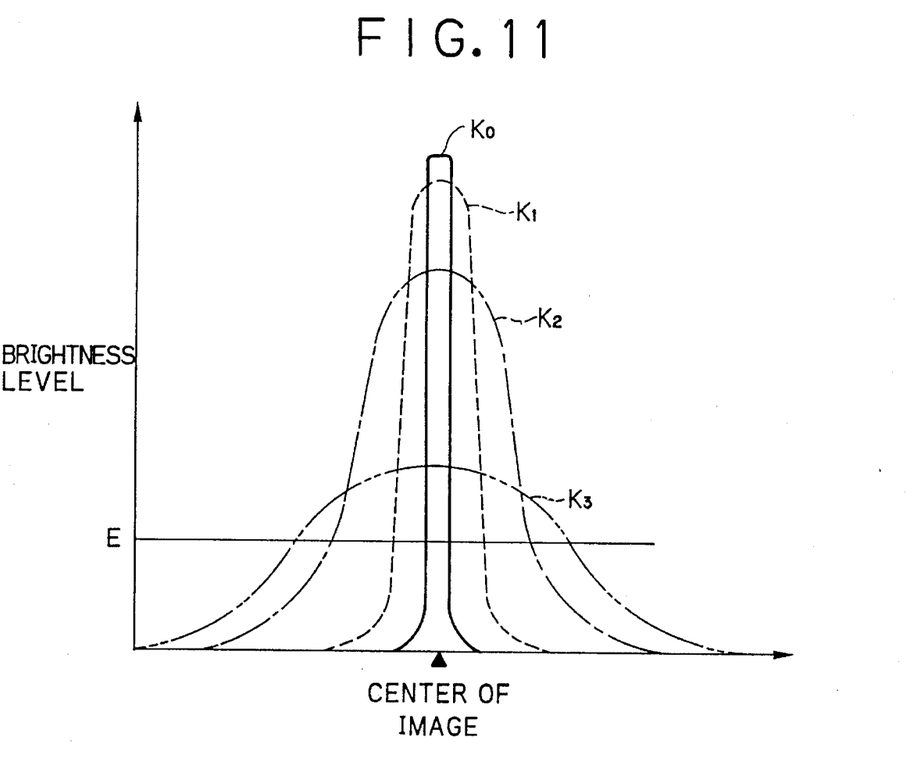
FIG. 11 is a graph illustrating image brightness distribution on the image sensor in different situations of focusing.

FIG. 11 illustrates the above characteristics of the point image, wherein a solid line shows the brightness curve Ko of the point image in the in-focus condition, whereas a curve K1 of dashed line, a curve K2 of chain-dotted line and a curve K3 of phantom line represent the brightness of the point image in three respectively different unfocused conditions, wherein the extent of unfocusing becomes greater ion the order from K1 to K2 to K3.

Therefore, if an area of the point image wherein brightness is above a predetermined brightness level E is detected, the area becomes smaller as the point image approaches the in-focus condition. On the other hand, the area having the same as or more than the predetermined brightness level E may be detected by the number of pixels of the image sensor 44. Therefore, by detecting data of the pixel number included in the high brightness area of the point image for each measurement position of the front lens 38a, and correlating the data to the front lens position, it is possible to determine a position of the front lens 38a wherein the area having the predetermined high brightness is reduced to the minimum, that position corresponding to an actual position of an image focal point of a lens to be inspected in the optical axis direction.

It is also possible to determine the location of the center of the high brightness portion based on the area data and check the misalignment of the lens to be inspected depending on whether that center is included in the allowable range D on the image sensor 44.

Although the present invention has been described with respect to the preferred embodiments shown in the drawings, the present invention is not to be limited to the above-described embodiment. Of course, the above-described lens inspection devices are generally applicable to the inspection of any lens and not merely to the inspection of the taking lens of a lens-fitted photographic film unit. The indexing table may be replaced by a linear device. The laser collimator may be replaced by another light source which can project a bundle of parallel light rays.

Thus, various modifications of the present invention may be possible without departing from the scope and spirit of the appended claims.

What is claimed is:

1. A lens inspection method for detecting the focal point of a lens, comprising the steps of:

positioning said lens in a predetermined inspecting position between a light source and an object focal point of an objective lens;

projecting a bundle of parallel light rays onto said lens parallel to an optical axis of said objective lens;

moving said objective lens stepwise along said optical axis so as to shift said object focal point into a plurality of measurement positions within a predetermined range along said axis including a predetermined normal focal point of said lens;

forming a point image of light from said objective lens on a two-dimensional image sensor;

picking up an image signal of said point image for each of said measurement positions; and determining an actual focal point of said lens as a position on the optical axis at which said image signal indicates said point image is brightest.

2. A lens inspection method as recited in claim 1, wherein said determining step comprises the steps of:

detecting data of brightness peak value of said point image for each of said measurement positions; and correlating brightness peak values with the positions of said objective lens, to determine said actual focal point as a position of the object focal point of said objective lens at which said point image has a maximum brightness peak value.

3. A lens inspection method as recited in claim 2, further comprising the steps of:

detecting data of brightness peak position of said point image on said two-dimensional image sensor for each of said measurement positions; and judging whether an optical axis of said lens is misaligned on the basis of said brightness peak position data with reference to the optical axis of said objective lens.

4. A lens inspection method as recited in claim 1, wherein said determining step comprises the steps of:

detecting for each of said measurement positions the number of pixels of said image sensor which are included in an area wherein brightness of said point image is above a predetermined level; and correlating said pixel numbers to the positions of said objective lens, to determine said actual focal point of said lens as a position of the object focal point at which said area has a minimum size.

5. A lens inspection method as recited in claim 4, further comprising the steps of:

calculating a center of said area; and judging whether an optical axis of said lens is misaligned on the basis of the position of said center with reference to the optical axis of said objective lens.

6. A lens inspection method as recited in claim 1, further comprising the step of removing a shutter means so that light rays can reach said lens, prior to said positioning step.

7. A lens inspection method as recited in claim 1, wherein said bundle of parallel light rays has a wavelength 670 nm.

8. A lens inspection device for detecting the focal point of a lens, comprising:

an objective lens;

a light source for projecting a bundle of parallel light rays along an optical axis through said objective lens;

a positioning device for positioning said lens in a predetermined inspection position between said light source and an object focal point of said objective lens;

a lens moving device for moving said objective lens stepwise along said optical axis so as to shift said object focal point into a plurality of measurement positions within a predetermined range along said axis including a predetermined normal focal point of said lens;

an image forming lens for forming a point image of light from said objective lens;

a two-dimensional image sensor disposed in an image plane of said image forming lens, said image sensor picking up an image signal of said point image for each of said measurement positions; and an image processing device connected to said image sensor for determining on the basis of brightness data of said image signal an actual focal point of said lens as a position on the optical axis.

9. A lens inspection device as recited in claim 8, wherein said objective lens is constituted of front and rear lens elements which are afocal to each other, and said lens moving device moves only said front lens element along the optical axis.

10. A lens inspection device as recited in claim 8, wherein said image processing device detects data of brightness peak value of said point image for each of said measurement positions and correlates brightness peak values to the positions of said objective lens, to determine said actual focal point as a position of the object focal point of said objective lens at which said point image has a maximum brightness peak value.

11. A lens inspection device as recited in claim 10, wherein said image processing device further detects data of brightness peak position of said point image on said two-dimensional image sensor for each of said measurement positions and judges whether an optical axis of said lens is misaligned on the basis of said brightness peak position data with reference to the optical axis of said objective lens.

12. A lens inspection device as recited in claim 11, wherein said image processing device detects for each of said measurement positions the number of pixels of said image sensor which are included in an area wherein brightness of said point image is above a predetermined level and correlates said pixel numbers with the positions of said objective lens, to determine said actual focal point of said lens as a position of the object focal point of said objective lens at which said area is reduced to a minimum.

13. A lens inspection device as recited in claim 12, wherein said image processing device further calculates a center of said area and judges whether an optical axis of said lens is misaligned on the basis of said center with reference to the optical axis of said objective lens.

14. A lens inspection device as recited in claim 8, further comprising a shutter means and a shutter opening means to open said shutter means so that light rays can reach said lens.

15. A lens inspection method as recited in claim 8, wherein said bundle of parallel light rays has a wavelength 670 nm.

16. A lens inspection device for detecting the focal point of a taking lens of a lens-fitted photographic film unit, said lens inspection device comprising:

an objective lens;

a light source for projecting a bundle of parallel light rays along an optical axis through said objective lens;

a positioning device for positioning said taking lens in a predetermined inspection position between said light source and an object focal point of said objective lens;

a lens moving device for moving said objective lens stepwise along said optical axis so as to shift said object focal point into a plurality of measurement positions within a predetermined range along said axis including a predetermined normal focal point of said taking lens;

an image forming lens for forming a point image of light from said objective lens;

a two-dimensional image sensor disposed in an image plane of said image forming lens, said image sensor picking up an image signal of said point image for each of said measurement positions; and an image processing device connected to said image sensor for determining on the basis of brightness data of said image signal an actual focal point of said lens as a position on the optical axis.

17. A lens inspection device as recited in claim 16, wherein said objective lens is constituted of front and rear lens elements which are afocal to each other, and said lens moving device moves only said front lens element along the optical axis.

18. A lens inspector as recited in claim 17, wherein said positioning device includes a conveyor for successively transporting main bodies of said lens-fitted photographic film units to said predetermined inspecting position in a horizontal state after said taking lens is mounted on said main body and before a rear cover of said lens-fitted photographic film unit is attached to said main body, said conveyor having a hole for passing light from said taking lens toward said objective lens.

19. A lens inspection device as recited in claim 18, further comprising a device for keeping a shutter blade of said lens-fitted photographic film unit in an open position wherein light can pass through said taking lens mounted on said main body, said shutter blade having a portion exposed outside of said lens-fitted photographic film unit so as to permit operating said shutter blade to move said shutter blade into said open position and to retain said shutter blade in said open position until said inspection is complete.

20. A lens inspection device as recited in claim 16, further comprising a shutter means and a shutter opening means to open said shutter means so that light rays can reach said lens.

21. A lens inspection method as recited in claim 16, wherein said bundle of parallel light rays has a wavelength 670 nm.

\* \* \* \* \*